UNITED STATES PATENT OFFICE.

HANS EDWARD FIERZ, OF BASEL, SWITZERLAND.

EXTRACTION OF NICKEL FROM MIXTURES OF NICKEL AND OTHER METALS.

1,103,747. Specification of Letters Patent. Patented July 14, 1914.

No Drawing. Application filed March 26, 1914. Serial No. 827,404.

*To all whom it may concern:*

Be it known that I, HANS EDWARD FIERZ, a citizen of the Swiss Confederation, residing at Basel, Switzerland, have invented new and useful Improvements Relating to the Extraction of Nickel from Mixtures of Nickel and other Metals, of which the following is a specification.

This invention relates to an improvement in the Mond process for the extraction of nickel by means of carbon monoxid from mixtures of this metal with copper and other metals such mixtures being obtained by the reduction of the said metals from the oxid to the metallic state by means of a gas, such as producer gas, which contains carbon monoxid.

According to the present invention, when the oxids of nickel, copper and in some cases other metals have been converted into the corresponding metals by means of a reducing agent (such as Mond gas or producer gas) which contains carbon monoxid, the said carbon monoxid is removed by abstraction or by displacement with another gas, *e. g.* hydrogen, nitrogen or other suitable gas, from contact with the said metals while the temperature is maintained and when the said carbon monoxid is removed the temperature is reduced to that required for the extraction of the nickel by means of carbon monoxid or gases containing the same. By this means practically the whole of the nickel present will be converted into an extremely finely divided pyrophorous metal, which will easily combine with carbon monoxid in the extracting or volatilizing stage of the process to form nickel carbonyl.

The following examples of carrying the said invention into practice may be given:—

Example 1: A mixture of copper and nickel oxid is obtained, for example, by carefully roasting the sulfids of the metals at a temperature of from 680° to 720° C. and preferably then extracting with dilute sulfuric acid, in order to remove the copper, *e. g.* in the form of copper sulfate, and the nickel sulfate as far as is practicable having regard to economical working. This mixture of copper and nickel oxids is then reduced with producer gas at a temperature not below 220° C. and preferably above 280° C. but not exceeding 500° C. When all the oxids are reduced, hydrogen is passed through the apparatus until all the carbon monoxid is displaced, the temperature being meanwhile kept above 280° C., whereupon the temperature of the vessel and its contents is reduced to 50° C. and pure carbon monoxid or producer gas passed over the metals to extract the nickel. Nitrogen or other inert gas may be used instead of the hydrogen to displace the carbon monoxid.

Example 2: The mixture of oxids is reduced by means of Mond gas. When the reduction is complete, the vessel is evacuated, the temperature being meanwhile kept above 280° C. and is then cooled either under diminished pressure or hydrogen is let in and then pure carbon monoxid or producer gas is passed over the metals at a temperature of 50° C., until the nickel is extracted.

The said invention can be applied to both continuous and intermittent processes of the kind above mentioned.

What I claim is:

1. A process for the extraction of nickel consisting in reducing metal oxids containing nickel by means of reducing agents containing carbon monoxid, removing the carbon monoxid from contact with the metals while the temperature is maintained substantially at that point at which the reduction has taken place, then lowering the temperature to that required for the extraction of the nickel by carbon monoxid, and extracting the nickel by means of carbon monoxid.

2. A process for the extraction of nickel consisting in reducing metal oxids containing nickel by means of reducing agents containing carbon monoxid, removing the carbon monoxid from contact with the metals by displacing it by means of another gas while the temperature is maintained substantially at that point at which the reduction has taken place, then lowering the temperature to that required for the extraction of the nickel by carbon monoxid, and extracting the nickel by means of carbon monoxid.

3. A process for the extraction of nickel consisting in reducing metal oxids containing nickel by means of reducing agents containing carbon monoxid, removing the carbon monoxid from contact with the metals by displacing it by means of hydrogen while the temperature is maintained substantially at that point at which the reduction has taken place, then lowering the temperature to that required for the extraction of the nickel by carbon monoxid, and extracting the nickel by means of carbon monoxid.

HANS EDWARD FIERZ.

Witnesses:
ARNOLD ZEEBER,
PHILIP HOLLAND.